United States Patent [19]
Yeh et al.

[11] Patent Number: 5,982,814
[45] Date of Patent: Nov. 9, 1999

[54] DYNAMIC CONTROL OF PROCESSOR UTILIZATION BY A HOST SIGNAL PROCESSING MODEM

[75] Inventors: Han-Chung Yeh, Sunnyvale; Tseng Jan Hsu, Pleasanton, both of Calif.

[73] Assignee: PC-Tel, Inc., San Jose, Calif.

[21] Appl. No.: 08/691,063

[22] Filed: Aug. 1, 1996

[51] Int. Cl.⁶ ..................................................... H04B 1/38
[52] U.S. Cl. ........................................... 375/222; 395/670
[58] Field of Search .................................. 375/222, 377, 375/220; 395/670, 677, 889

[56] References Cited

U.S. PATENT DOCUMENTS

| | | | |
|---|---|---|---|
| 4,965,641 | 10/1990 | Blackwell et al. | 375/219 |
| 4,972,411 | 11/1990 | Fushimi et al. | 370/110.1 |
| 4,991,169 | 2/1991 | Davis et al. | 370/77 |
| 4,995,074 | 2/1991 | Goldman et al. | 379/97 |
| 5,265,249 | 11/1993 | Kumamoto | 395/704 |
| 5,375,228 | 12/1994 | Leary et al. | 395/575 |
| 5,442,789 | 8/1995 | Baker et al. | 395/650 |
| 5,678,059 | 10/1997 | Ramaswamy et al. | 710/1 |

*Primary Examiner*—Young T. Tse
*Attorney, Agent, or Firm*—Skjerven, Morrill, MacPherson, Franklin & Friel; David T. Millers

[57] ABSTRACT

A host signal processor (HSP) modem which includes procedures executed in response to interrupts has a CPU utilization control procedure which uses the numbers of clock cycles associated with modem tasks and the total number of clock cycles between interrupts to select a task for execution during the interrupts. The utilization control procedure changes or selects the task as required to automatically adjust the HSP modem for the available processing power and a desired maximum percentage utilization of a host computer. For example, the task can be selected to match the data transfer rate of the HSP modem with available processing power. The HSP modem is more robust and is operable in host computers having relatively low processing power. A user can change the maximum utilization of processing power used by the HSP modem so that more processing power is available for other purposes.

14 Claims, 3 Drawing Sheets

DYNAMIC CONTROL OF PROCESSOR UTILIZATION BY A HOST SIGNAL PROCESSING MODEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to modems in which the processor of a host computer executes procedures which implement modem functions or protocols.

2. Description of Related Art

Host signal processing (HSP) modems use a central processing unit (CPU) in a host computer to perform digital signal processing tasks which are performed by hardware in conventional modems. For example, a conventional modem receives data from a host computer, converts the data to an analog signal in compliance with a communication protocol, and transmits the analog signal on telephone lines. The conventional modem also receives an analog signal from telephone lines, extracts data from the analog signal, and transmits the data to the host computer.

For an HSP modem, the host computer executes software which performs many of the conversions performed by hardware in a conventional modem. Hardware in HSP modems performs simple analog-to-digital and digital-to-analog conversions such as converting a received analog signal to a series of digital samples which represent amplitudes of the received signal. The host computer executes software which interprets the samples according to a modem protocol and derives received data from the samples. The host computer also generates output samples which represent amplitudes of a transmitted analog signal in compliance with the modem protocol, and the hardware of the HSP modem converts the output samples into the transmitted analog signal.

Execution of HSP modem software typically occurs during periodic interrupts of the host CPU. During each such interrupt, the host CPU executes a task which reads a first block of digital samples from the modem hardware, extracts received data from the first block of samples, encodes data to be transmitted as a second block of digital samples representing an analog signal in accordance with a modem protocol, and writes the second block of digital samples to the modem hardware. Between interrupts, the modem hardware uses the second block of digital samples to maintain a continuous transmitted signal and collects a block of samples of the received signal to be read during the next interrupt. The blocks of digital samples have a size about equal to the sampling rate of the modem hardware times the time between consecutive interrupts. The amount of data represented by a block of samples depends on a data transfer rate for the modem protocol.

When compared to conventional modems, HSP modems have less complex (and less expensive) hardware because HSP modems do not require dedicated signal processors. However, HSP modems consume part of the host computer's processing power, and the varied available computing power of different host computers is a concern for HSP modems. For example, host CPUs for IBM PC compatible computers come in a variety of types (e.g. 486, 586, 686, Pentium, and K5) which operate at a variety of clock speeds. Some computer systems may be unable to execute HSP modem processes and still provide adequate performance for other applications such as communications software which is interrupted for modem processes. In a worst case, the host CPU has insufficient available processing power for the HSP modem alone, and the HSP modem is inoperable.

SUMMARY OF THE INVENTION

In accordance with an aspect of the invention, a user selects a desired maximum percentage of processing power which a host signal processing modem can consume, and the HSP modem configures itself to consume less than that maximum percentage of processing power. In one embodiment, an HSP modem has a utilization control process that automatically measures the processing power of a host computer, for example, by determining a CPU operating frequency or the number of clock cycles between periodic interrupts for the HSP modem. The HSP modem includes a set of tasks which implement various data transfer rates and require different amounts of processing power. The number of clock cycles required to complete each task indicates the required amount of processing power for the task. The utilization control process selects the task with the highest data transfer rate such that the ratio of the number of clock cycles for the selected task to the total number of clock cycles between interrupts is less than or equal to the maximum percentage utilization. Accordingly, the HSP modem in accordance with an embodiment of the invention automatically adjusts the data transfer rate to the processing power available from the host CPU and provides the performance which a user desires for other applications. This makes the HSP modems more robust and useable in a large variety of computer systems and applications.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
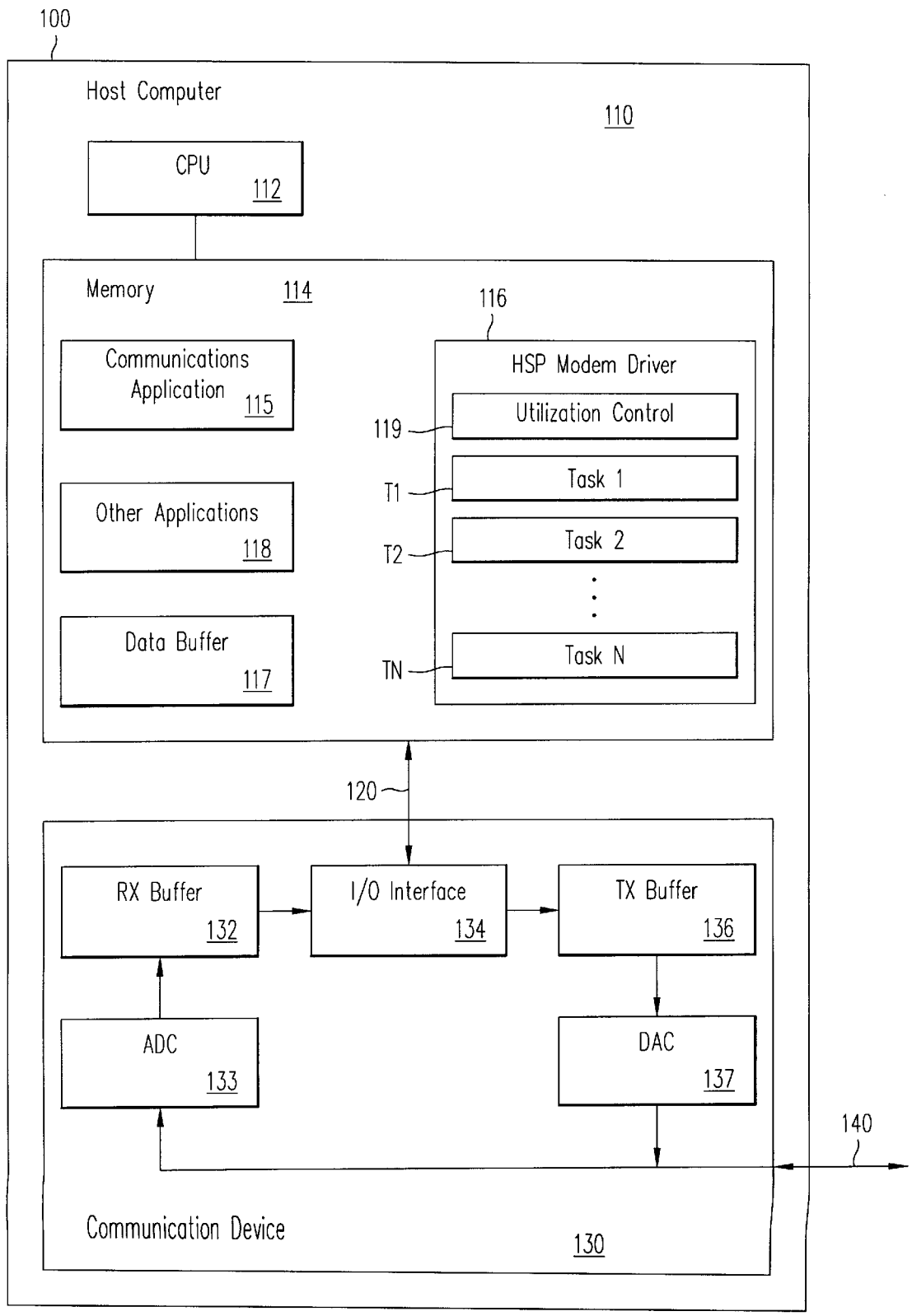
FIG. 1 shows a block diagram of a host signal processing modem system in accordance with an embodiment of the invention.

A host signal processing (HSP) modem in accordance with an embodiment of the invention includes a utilization control process that automatically configures the HSP modem according to the processing power of a host computer. FIG. 1 shows a computer system 100 implementing an HSP modem in accordance with an embodiment of the invention. Computer system 100 includes a host computer 110 having a CPU 112 and a memory 114 connected via a bus 120 to a communication device 130. In an exemplary embodiment, computer system 100 is an IBM PC compatible system, and bus 120 is a local bus such as a PCI, VESA, or ISA bus. CPU 112 is a processor implementing an x86 instruction set.

Device 130 constitutes a hardware portion of the HSP modem and includes an analog-to-digital converter (ADC)

133 which converts an analog signal received on telephone lines 140 into a series of digital samples which are stored in a buffer 132. Host computer 100 can read digital samples from buffer 132 via an input/output (I/O) interface 134 and can write digital samples through I/O interface 134 to a buffer 136. A digital-to-analog converter (DAC) 137 converts the samples from buffer 136 into an analog signal which is transmitted on telephone lines 140. ADC 133 and DAC 137 can be separated elements or parts of a standard codec integrated circuit. Commonly owned U.S. patent app. Ser. No. 08/527,668, entitled "Host Signal Processing Communication System that Compensates for Missed Execution of Signal Maintenance Procedures", which is hereby incorporated by reference in its entirety, describes an exemplary embodiment of hardware for HSP modems which transfer data during periodic interrupts.

A software portion of the HSP modem includes an HSP modem driver 116 which communicates with device 130 by reading or writing digital samples in buffers 132 or 136. In the exemplary embodiment of the invention, HSP modem driver 116 is a custom device driver for an operating system such as Windows 95, Windows NT, or OS2. Such device drivers are well known in the art. Commonly owned U.S. patent app. Ser. No. 08/677,485, entitled "Host Signal Processor Modem and Telephone", filed Jul. 9, 1996, which is hereby incorporated by reference in its entirety, describes an exemplary HSP modem driver in such operating systems.

During each interrupt in a series of periodic interrupts scheduled for the HSP modem, HSP modem driver 116 reads a first block of samples from buffer 132, reads data to be transferred (if available) from a data buffer 117, converts the first block of samples to received data which is then written to buffer 117, and converts the data to be transmitted into a second block of digital samples which is written to buffer 136. The first and second blocks of digital samples have a size about equal to the product of the time between consecutive interrupts and a sampling rate of ADC 133 and DAC 137.

HSP modem driver 116 includes tasks T1 to TN which implement different modem protocols or data transfer rates. Tasks T1 to TN may be separate software modules or one or more configurable software modules where input parameters of a configurable software module select which task T1 to TN the module performs when executed. Each task when executed converts samples to data and data to samples according to the protocol associated with the task. The time required for execution of any of tasks T1 to TN depends on the clock frequency for operating CPU 112 and a respective count C1 to CN of clock cycles needed to complete the respective tasks T1 to TN. The number of clock cycles to complete a task, in turn, depends on the type of CPU 112 (e.g. whether CPU 112 is a 486, 586, 686, pentium, or K5 processor) and the amount of data represented by a block of samples. In general, tasks which implement modem standards having lower data transfer rates (i.e. less data per block of samples) require fewer clock cycles because fewer data values are manipulated during each interrupt.

Figure 2:
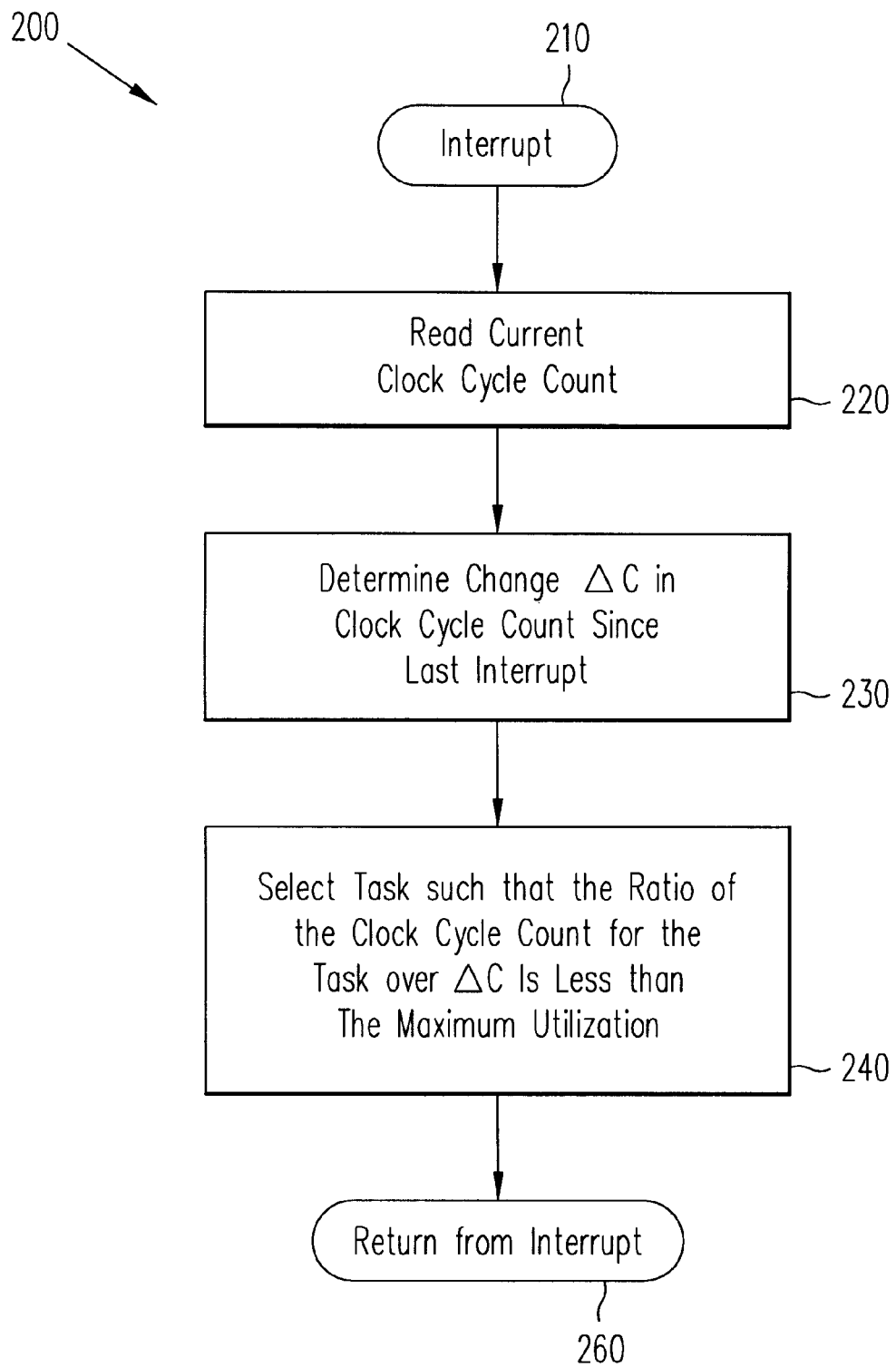
FIGS. 2 and 3 show flow diagrams of procedures which control host signal processing modem utilization of the host processor.

HSP modem driver 116 further includes a utilization control process 119 that selects the one of tasks T1 to TN to be executed during interrupts. FIG. 2 shows a flow diagram of HSP modem interrupt procedure 200 during which utilization control process 119 for system 100 of FIG. 1 is executed. Procedure 200 is executed during initialization of the HSP modem or during training in a handshaking sequence in which the HSP modem establishes a connection with another modem. In a first step 220 following an interrupt 210, procedure 200 determines a clock cycle count for host CPU 112. Many CPUs provide instructions which simplify maintaining and determining clock cycle counts. In particular, Pentium processors maintain 64-bit wrap-around counters which increment each clock cycle, and an undocumented instruction RDSTC (machine code 0F31h) copies a 64-bit count from a clock-cycle counter into accessible registers. The Appendix includes assembly language listings of procedures CountCPU and CountDSP that use instruction RDSTC to retrieve the clock cycle count. After reading the clock cycle count, HSP modem driver 116 determines, in step 230, the difference between the just read clock cycle count and a clock cycle count read during a previous interrupt. The difference indicates a total count $\Delta C$ of clock cycles that have passed since the last interrupt and indicates the operating frequency of CPU 112 since the scheduled time between interrupts is a constant independent of the computing power of host computer 112. The operating frequency of CPU 112 is alternatively determined in any convenient fashion available in host computer 110. The total count $\Delta C$ of clock cycles between interrupts depends on the operating frequency and should be approximately constant unless an interrupt is missed.

In step 240, procedure 200 selects one of tasks T1 to TN based on information including total count $\Delta C$ of the clock cycle count between interrupts (or clock frequency), clock cycle counts C1 to CN (or minimum frequencies) required for tasks T1 to TN respectively, and a maximum permitted utilization MAXU of host CPU 112. Total count $\Delta C$ being a difference between the clock cycle counts read in two different interrupts is not determined during a single interrupt for the HSP modem. Accordingly, selection of a task is delayed at least until the second interrupt for the HSP modem. Counts C1 to CN for tasks T1 to TN can be determined in the laboratory for a variety of processors and incorporated in HSP modem software. Alternatively, host computer 110 can determine the counts C1 to CN during an initialization process for HSP modem driver 116 as described below.

If all necessary information is available, step 240 selects a task TX such that a ratio of the count CX of clock cycles required to complete selected task TX to the total count $\Delta C$ of clock cycles between interrupts is less than maximum utilization MAXU but as large as possible to provide high performance. Following selection 240, host CPU 112 returns from the interrupt procedure 200. Procedure 200 including selection step 240 can be repeated and performed in more than one interrupt to check for errors in task selection which might result in the unlikely event that an interrupt was missed. If the same task is selected more than once, the selection is very likely correct. After a connection with another modem is established, utilization control process 119 and procedure 200 are no longer required. The selected task TX is executed during each interrupt.

Utilization control process 119 always selects a task that host computer 110 is capable of executing within the regular scheduled interrupt interval. Accordingly, an HSP modem in accordance with the invention is robust and capable of operating when host computer 110 is a low power system and unable to handle a high data transfer rate. In the exemplary embodiment of the invention, the maximum utilization MAXU of CPU 112 has a default value which limits the HSP modem to less than 70% of the CPU's processing power, but HSP modem driver 116 interprets a custom modem command, such as a custom "AT" command, to change the maximum utilization MAXU. This allows a user to change the amount of processing power that the HSP modem consumes after connecting to another modem.

Figure 3:
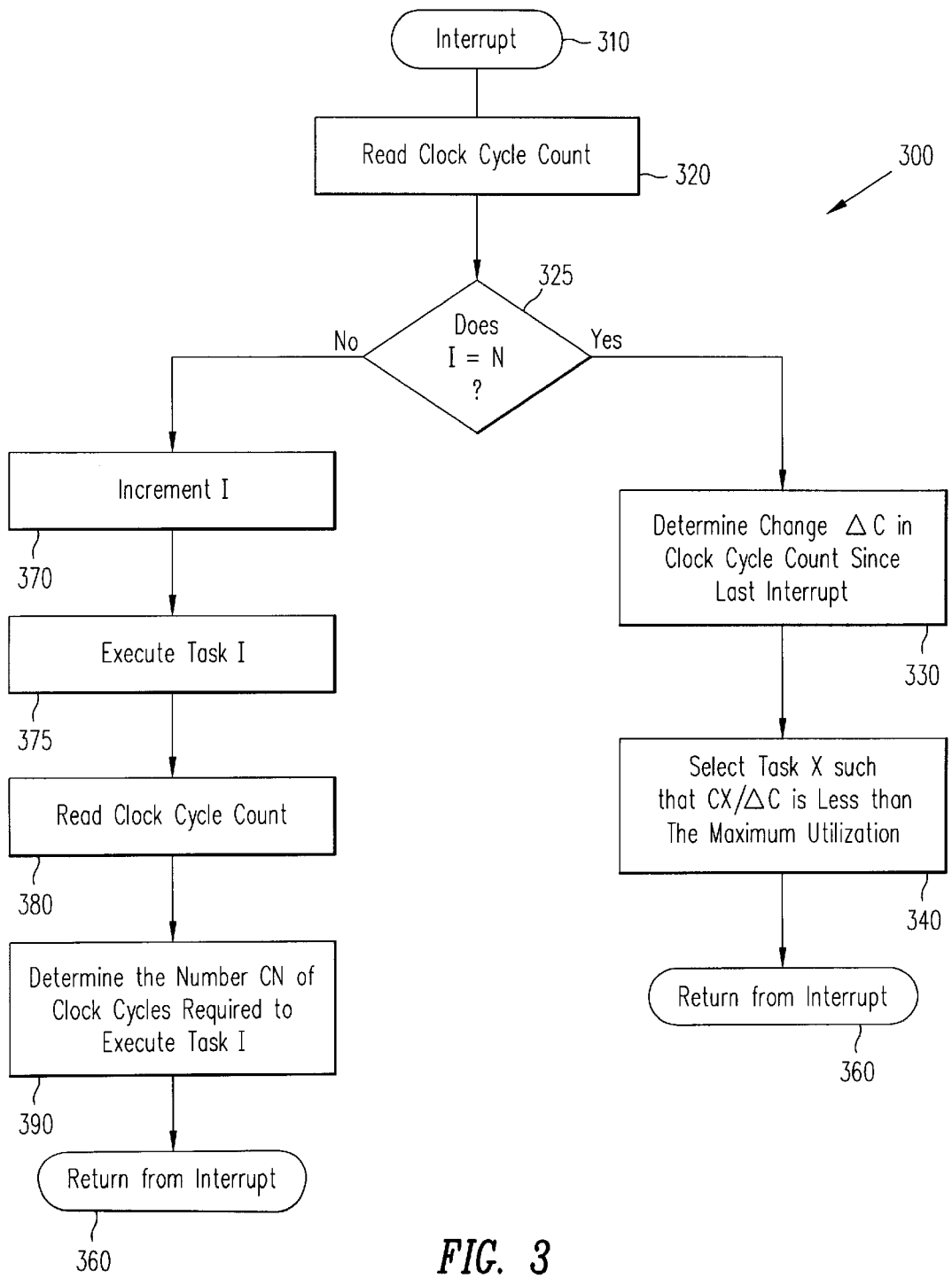

FIG. 3 shows a flow diagram of an HSP modem interrupt process 300 which uses initial interrupts to determine values for counts C1 to CN. Upon loading HSP modem driver 116 into memory 114, an index I is set to zero, and a set of interrupts are scheduled. Following an interrupt 310, process 300 in step 320 reads the clock cycle count for the processor as described above in regard to step 220 of FIG. 2. If index I is less than N, process 300 branches to step 370 and increments index I. After step 370 in a first execution of process 300, index I is equal to 1. In step 375, the host processor executes task TI using dummy data and samples. In step 380, the clock cycle count is read again, and the difference between the clock cycle count read in step 380 and the clock cycle count read in step 320 indicates the number CI of clock cycles used to execute task TI. Step 390 determines count CI and stores that value for later use. Following step 390, process 300 returns from the interrupt.

For subsequent interrupts, index I is incremented and values CI are determined until the last task TN has been executed using dummy data and all counts C1 to CN are known for the system. After index I is incremented to N, the determination of counts C1 to CN is complete; and interrupt process 300 executes steps 320, 330, and 340 which are substantially identical to steps 220, 230, and 240. In particular, step 340 selects a task according to counts C1 to CN previously determined for tasks T1 to TN.

Although the invention has been described with reference to particular embodiments, the description is only an example of the invention's application and should not be taken as a limitation. Various adaptations and combinations of features of the embodiments disclosed are within the scope of the invention as defined by the following claims.

APPENDIX

Pentium processors implement an undocumented instruction "RDTSC" (machine opcode OF31h) which stores the current 64 bits cycles count in the EDX:EAX register pair. Procedures CountCPU and CountDSP uses the RDTSC opcode to respectively measure the number of machine cycles in the 3.3 millisecond interrupt interval for the HSP modem and determine the duration of HSP modem tasks.

```
= = = >Entry of the interrupt handling routine
              beginning call CountCPU
                      .
                      .
                      .
                  (HSP Task)
                      .
                      .
                      .
              ending call CountDSP
= = = > Exit of the interrupt handling routine
```

The followings equations indicate the number of CPU cycles in each interrupt interval and in the HSP modem task.

Total CPU cycles in each interrupt interval = current interrupt returned value of beginning call CountCPU-previous returned value of beginning call CountCPU CPU cycles required in the HSP modem task = returned value of ending call CountDSP-returned value of the beginning call CountCPU Following are the pseudocode of the CPU cycle measurement implementation:

```
;;**************************************************
;;
;; CountCPU: calculate the interrupt interval machine cycles
;;
;; Input = nothing
;; return ecx = count of the interrupt machine cycle.
;; edx = count of last calculate DSP machine cycles.
```

APPENDIX-continued

```
;;
;;**************************************************
CountCPU  proc
          push    eax
          push    ebx
          mov     ebx,low_count      ;;get previous counts (low DD)
          mov     ecx,hi_count       ;;get previous counts (hi DD)
          db      0fh
          db      31h                ;;machine code of RDSTC
          mov     hi_count,edx       ;;save current count (hi DD)
          mov     low_count,eax      ;;save current count (low DD)
          cmp     edx,ecx            ;;compare current and last hi
                                     dd counts
          jz      no_inc             ;;counter did not inc to hi DD
          neg     eax
          add     eax,ebx
          jmp     @F
no_inc:
          sub     eax,ebx
@@:
          xchg    eax,ecx            ;;put CPU_COUNT in ecx
          mov     edx,DSP_COUNT      ;;put DSP count in edx
          pop     ebx
          pop     eax
          ret
;;
CountCPU  endp
;;**************************************************
;; CountDSP: calculate our Task cycles
;;
;; Input = nothing
;; return
;; updated DSP_COUNT
;;
;;**************************************************
CountCPU  proc
          push    eax
          push    ebx
          push    ecx
          push    edx
;;
          mov     ebx,low_count      ;;get counts before
                                     execution(low DD)
          mov     ecx,hi_count       ;;get counts before
                                     execution(hi DD)
          db      0fh
          db      31h
          cmp     edx,ecx            ;;compare current and last hi
                                     dd counts
          jz      no_hi_inc          ;;counter did not inc to hi DD
          neg     eax
          add     eax,ebx
          jmp     @F
no_hi_inc:
          sub     eax,ebx
@@:
          mov     DSP_COUNT,eax      ;;save DSP count
;;
          pop     edx
          pop     ecx
          pop     ebx
          pop     eax
;;
          ret
CountCPU  endp
```

We claim:

1. A modem comprising:

a communication device adapted for connection to a host computer, the communication device comprising an analog-to-digital converter coupled to convert a received analog signal to a first series of digital samples; and a process adapted for execution by the host computer, the process comprising:

a plurality of tasks, each task implementing a different protocol for converting the first series of digital samples into received data values; and a utilization control routine which selects one of the plurality of tasks for execution when the communication device is receiving the received analog signal, wherein the utilization control routine selects a task which can be completed using less than a maximum percentage of processing time.

2. The modem of claim 1, wherein each task implements a protocol for converting data values to be transmitted into a second series of digital samples and the communication device further comprises a digital-to-analog converter coupled to convert the second series of digital samples to a transmitted analog signal.

3. The modem of claim 2, wherein the analog-to-digital converter and digital-to-analog converter constitute portions of a codec.

4. The modem of claim 1, wherein each task implements a protocol having a different data transfer rate.

5. The modem of claim 4, wherein the utilization control routine selects the task which provides highest data transfer rate of the tasks using less than the maximum percentage of processing time.

6. The modem of claim 1, wherein the maximum percentage of processing time utilizes less than 70% of the processing power of the host computer.

7. A modem comprising:

a communication device adapted for connection to a host computer, the communication device comprising a digital-to-analog converter coupled to convert a first series of digital samples to a transmitted analog signal; and a process adapted for execution by the host computer, the process comprising:
a plurality of tasks, each task implementing a different protocol for converting data values into the first series of digital samples; and
a utilization control routine which selects one of the plurality of tasks for execution when the communication device is transmitting the transmitted analog signal, wherein the utilization control routine selects the task which can be completed using less than a maximum percentage of processing time.

8. The modem of claim 7, wherein the utilization control routine selects the task which provides highest data transfer rate of the tasks using less than the maximum percentage of processing time.

9. A method for controlling power usage in a host signal processing modem, comprising:

scheduling interrupts that trigger execution by a host processor of procedures which implement functions of the host signal processing modem;

having the host processor execute a procedure that selects a task from among a plurality of tasks, wherein the task is selected according to whether execution of the task would complete within a desired fraction of a time between the interrupts; and executing the selected task in response to a scheduled interrupt, wherein the task converts between samples of an analog signal and data represented by the analog signal.

10. The method of claim 9, wherein the procedure that host processor executes to select from among the plurality of tasks comprises:

reading, during a first interrupt, a first count of clock cycles of the processor;

reading, during a second interrupt, a second count of the clock cycles of the host processor;

determining from the difference between the first and second counts, a number of clock cycles between the first interrupt and the second interrupt; and selecting as the selected task one of the plurality of tasks where a ratio of a number of clock cycles required to complete the selected task to the number of clock cycles between the first and second interrupts is less than the desired fraction.

11. The method of claim 10, further comprising executing tasks from the plurality of tasks to determine for each task executed, a number of clock cycles required to execute that task.

12. The method of claim 10, further comprising:

determining a set of values prior to operating the host signal processing modem, each value indicating how many clock cycles a corresponding task in the plurality of tasks requires for completion;

storing in the set of values in a memory accessible to the procedure that selects the task, wherein the procedure that selects the task uses the set of values to determine which of the tasks is selected.

13. The method of claim 9, wherein the selected task is the one which would be completed nearest the desired fraction of time between the interrupts.

14. The method of claim 9, wherein the desired fraction of time between interrupts utilizes less than 70% of the processing power of the host processor.

* * * * *